H. RUTH.
PLUNGER LUBRICATING RING.
APPLICATION FILED SEPT. 10, 1909.
947,650.
Patented Jan. 25, 1910.
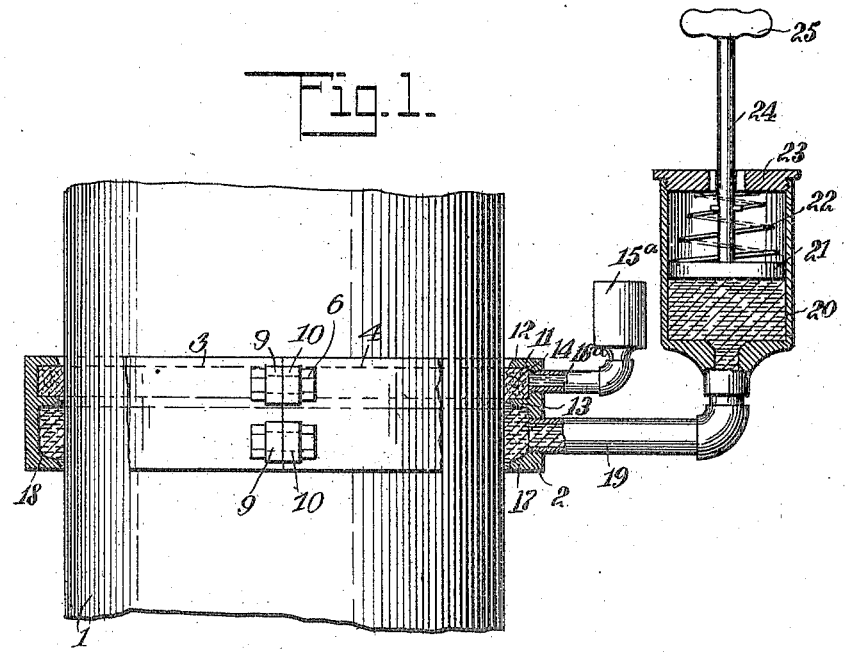
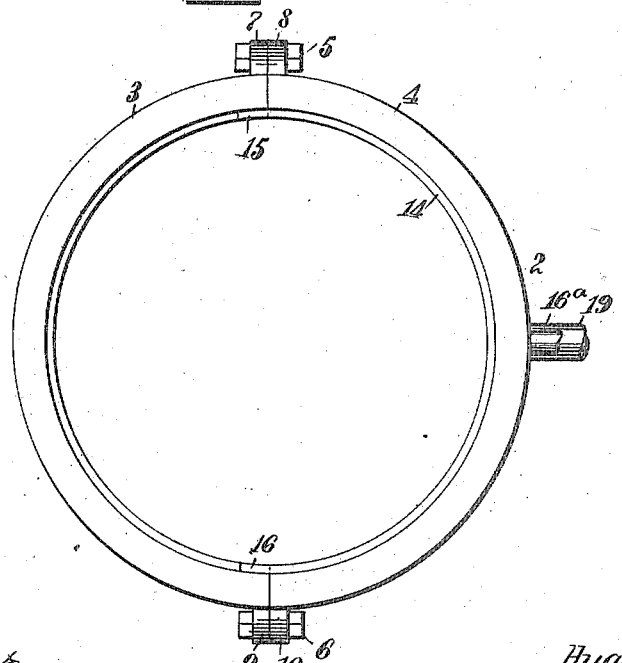
WITNESSES
L. Almquist
H. Whiting.
INVENTOR
Hugo Ruth
BY
ATTORNEYS

UNITED STATES PATENT OFFICE.

HUGO RUTH, OF NEW YORK, N. Y.

PLUNGER-LUBRICATING RING.

947,650.  Specification of Letters Patent.  Patented Jan. 25, 1910.

Application filed September 10, 1909. Serial No. 517,022.

*To all whom it may concern:*

Be it known that I, HUGO RUTH, a subject of the German Emperor, and a resident of the city of New York, borough of Manhattan, in the county and State of New York, have invented a new and Improved Plunger-Lubricating Ring, of which the following is a full, clear, and exact description.

This invention relates to a device adapted to keep the plunger of an elevator lubricated in an efficient and thorough manner.

An object of this invention is to provide a device which will be simple in construction, inexpensive to manufacture, strong, durable, and positive in its operation. A further object of this invention is to provide means whereby an elevator plunger may be kept thoroughly lubricated by a plurality of lubricating substances, in a simple and efficient manner.

These and further objects, together with the construction and combination of parts, will be more fully described hereinafter and particularly set forth in the claims.

Reference is to be had to the accompanying drawings forming a part of this specification, in which similar characters of reference indicate corresponding parts in both views, and in which—

Figure 1 is a view in elevation, partly in section, showing my device connected to a fragment of an elevator plunger; and Fig. 2 is a fragmentary top plan view of the lubricating ring.

Referring more particularly to the separate parts of the device, 1 indicates an elevator plunger, which may be of any suitable form, preferably consisting of a cylindrical shaft.

2 indicates a lubricating ring, formed in two sections 3 and 4, which are secured together in any suitable manner, as by means of bolts 5 and 6 which pass through perforated outstanding lugs 7, 8, 9 and 10 on the two halves 3 and 4 of the ring 2. It is to be noted that these lugs 7 to 10 are arranged in pairs on each end of each half of the ring, so that they form a positive means of accurately adjusting the halves of the ring relative to each other. Near the upper end of the ring 2, there is provided an annular channel 11, formed between annular rings 12 and 13. This annular channel is preferably filled with a suitable wiper ring 14, formed of any suitable material, such as felt, and composed of a plurality of parts joined together by diagonal joints, as indicated at 15 and 16. This method of joining the felt constituents of the ring leaves no gap in the continuity of the wiper, so that no portion of the plunger 1 is left uncared for. It is to be noted that the wiper ring 14 preferably extends beyond the rings 12 and 13, and is adapted to project over them if necessary.

The wiper ring 14 is supplied with a suitable fluid lubricant, such as oil, by means of an oil cup $15^a$, which is connected at its lower end to the channel 11 by means of a pipe $16^a$ that extends through an opening in the ring 2 extending into the channel 11. The feed of this oil cup may be of any suitable type, but preferably consists of a gravity feed. The annular ring or flange 13 forms, with a lower annular flange 17 on the ring 2, an annular channel 18, which is adapted to be filled with a suitable semi-solid lubricant, such as grease. This grease is supplied to the annular channel 18 by means of a pipe 19 which extends through an opening in the ring 2, and is fed by a cup 20. The feed of this cup preferably consists of a force-feed, which comprises a piston 21, normally pressed downwardly by a spring 22, which acts against a top 23 on the cup 20. The piston 21 is provided with a rod 24 and a handle 25, whereby the feed may be manually controlled.

The purpose and operation of the device may be readily understood from the above description. The ring 2 is secured in any suitable support, and is so arranged that the plunger will reciprocate back and forth therein. The wiper 14, supplied with the lighter lubricating oil, cleans and polishes the plunger, while the channel 18, supplied with the thick lubricant, coats the plunger with a suitable lubricating surface.

The division of the lubricating ring into a plurality of parts with a plurality of lugs on each end of each part, enables the device to be readily and accurately adjusted to a plunger.

Having thus described my invention, I claim as new and desire to secure by Letters Patent:—

1. A lubricating ring, comprising a plurality of sections having a plurality of inwardly-extending annular flanges thereon forming channels between them, means for securing said sections together, a wiper in one of said channels, means for supplying a fluid lubricant to said wiper, and means for supplying a semi-solid lubricant to another of said channels.

2. A lubricating ring, comprising a plurality of sections, each of said sections having a plurality of lugs on each end thereof, means for securing said lugs together, said sections also having a plurality of annular flanges extending inwardly therefrom and forming channels between them, a felt wiper in one of said channels, means for supplying a lubricant to said wiper, and a force-feed lubricating device for another of said channels.

3. A lubricating ring, comprising a member having a plurality of inwardly-extending annular flanges forming juxtaposed channels between them, a flexible wiper in one of said channels, means for supplying a fluid lubricant to said flexible wiper, and means for supplying a semi-solid lubricant to another of said channels.

4. A lubricating ring, comprising a plurality of sections having inwardly-extending annular flanges forming channels between them, each of said sections having a plurality of outwardly-extending lugs on each end thereof, means for securing said lugs together, a felt wiper ring, composed of a plurality of sections having their joints formed on a diagonal, in one of said channels, means for supplying a fluid lubricant to said wiper ring, and a force-feed cup connected to another of said channels and adapted to fill said last-mentioned channel with a semi-solid lubricant.

In testimony whereof I have signed my name to this specification in the presence of two subscribing witnesses.

HUGO RUTH.

Witnesses:
HORATIO WHITING,
PHILIP D. ROLLHAUS.